INVENTOR
ELWOOD P. WENZELBERGER
BY
ATTORNEYS.

April 27, 1954  E. P. WENZELBERGER  2,676,469
METHOD AND APPARATUS FOR DEHYDRATION
OF LIQUIDS BY FREEZING
Filed Nov. 20, 1950  2 Sheets-Sheet 2
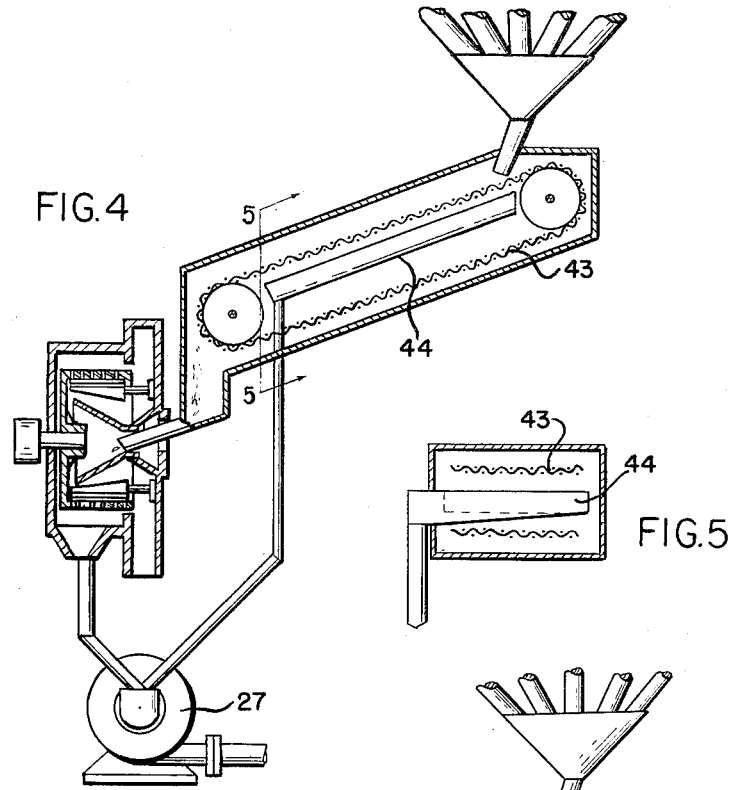
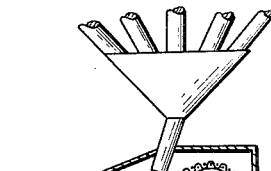
FIG.5
FIG.2
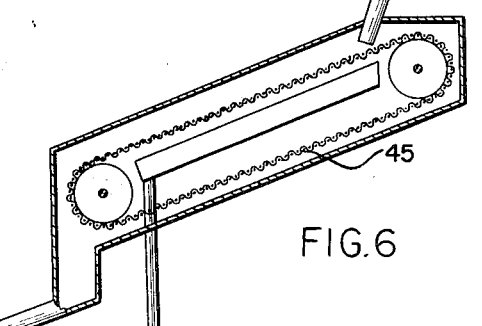
FIG.6
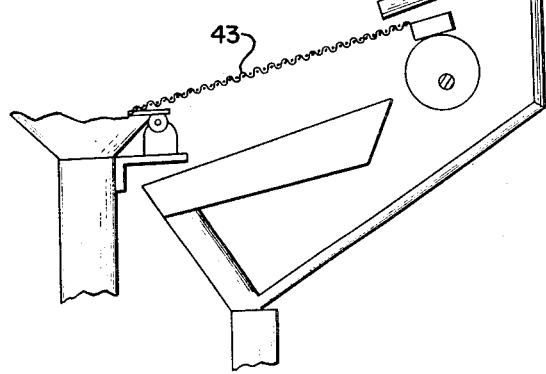
INVENTOR
ELWOOD P. WENZELBERGER
BY
Toulmin & Toulmin
ATTORNEYS Patented Apr. 27, 1954

2,676,469

UNITED STATES PATENT OFFICE 2,676,469

METHOD AND APPARATUS FOR DEHYDRATION OF LIQUIDS BY FREEZING

Elwood Paul Wenzelberger, Dayton, Ohio, assignor to The Commonwealth Engineering Company of Ohio, Dayton, Ohio, a corporation of Ohio Application November 20, 1950, Serial No. 196,685

9 Claims. (Cl. 62—124)

My invention relates to the method and apparatus of dehydrating heat sensitive materials.

My invention relates particularly to the successive stages of dehydration by freezing at progressively lower temperatures with the discharge from each stage of temperature of the liquid and the ice into which the water has been converted from the liquid so as to successively move the ice as the temperature decreases.

It is a further object to provide means of separating the ice and liquid prior to the delivery of the ice from each stage to the centrifuge.

It is an object of this invention to deliver from each stage of freezing the entire body of the liquid bearing solids and the ice which has been formed from a part of the liquid. This composite material is delivered to means for separating the major portion of the liquid bearing the solids from the ice. The liquid bearing the solids so separated is returned to the next lower stage of refrigeration. The ice so separated has entrained with it a small amount of liquid bearing solids. This amount of liquid and the ice are separated in a centrifuge. The ice is discharged for the purpose of reseeding one or more of the dehydrating chambers or for precooling the liquids to be dehydrated. The juice extracted in the centrifuge is returned to the next succeeding tank in which dehydration is to be attempted at the next succeeding stage.

It is a further object of this invention to produce in each stage of dehydration a fluid mass of ice crystals free of solids floating in the remaining liquid bearing the solids. It is essential that this mass remain in a fluid condition so it can be rapidly discharged as well as rapidly agitated for it must be in this condition both in the dehydrating tank and for the purposes of separation.

It is a further object to provide means of being able to dump the contents of each tank successively and completely and to allow the entire contents of the tank to make its exit both by gravity and by mechanical propulsion into open troughs.

It is an object to permit such descent to allow the ice to separate to free the associated liquid bearing the solids.

It is a further object to so deliver the ice and the liquid bearing solids through troughs so as to prevent the reconsolidation of the ice with the liquid bearing the solids.

Referring to the drawings:

Figure 2 is a section on the line 2—2 of Figure 1 looking in the direction of the arrows.

Figure 4 is a modified form of Figure 1 showing a modified form of ice and liquid bearing solids separation.

Figure 5 is a section on the line 5—5 of Figure 4 looking in the direction of the arrows.

Figure 6 is a view similar to Figure 1 showing the use of a vibrating screen as a part of the means of separation of the ice and juice.

Figures 1, 3:
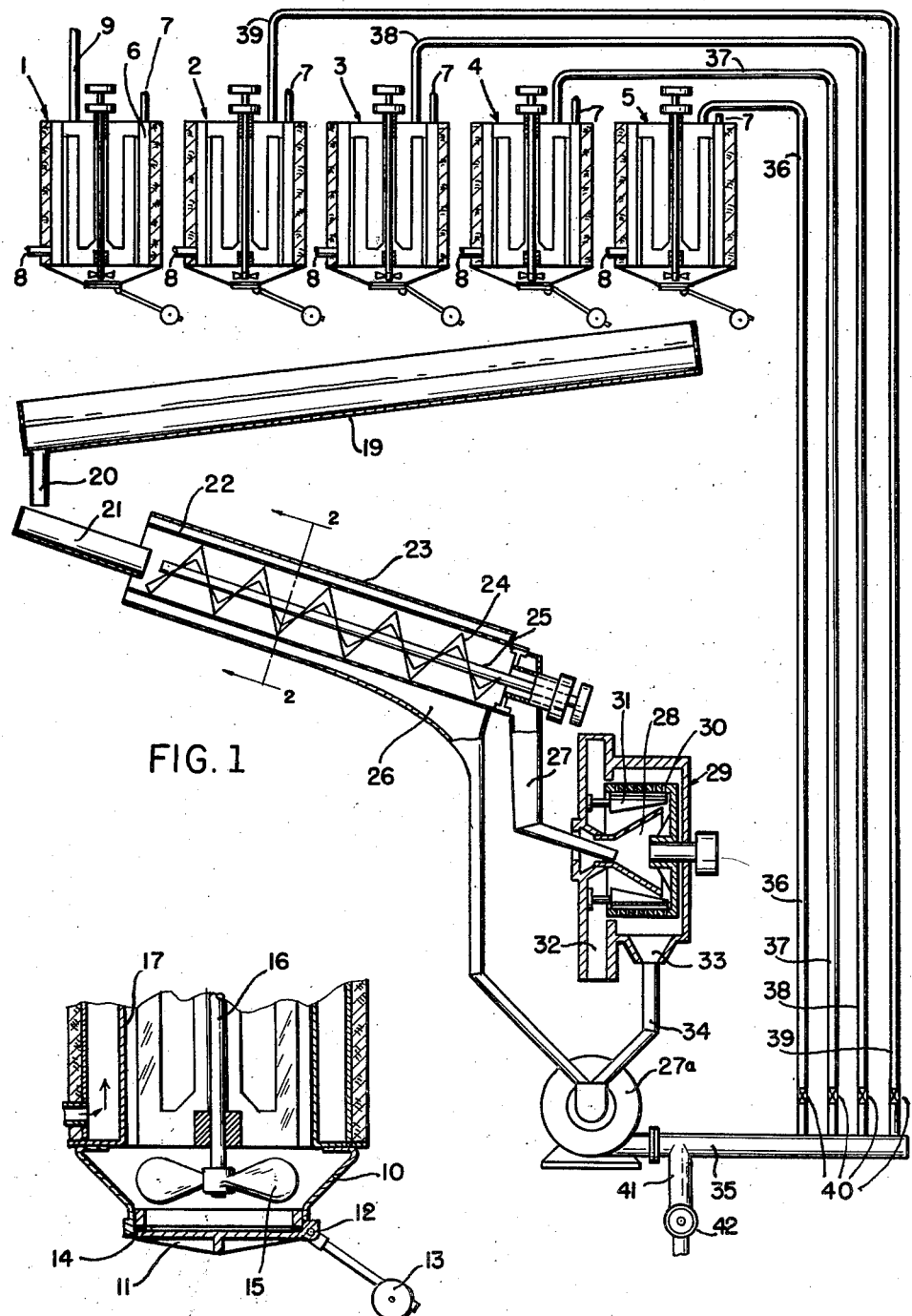
Figure 1 is a diagrammatic view partially in section of the complete dehydration mechanism.
Figure 3 is an enlarged section showing the bottom portion of a typical dehydration tank and the means employed for agitation and particularly dumping of the contents of the tank.

Referring to the drawings in detail, the process consists generally of precooling the liquid to be dehydrated to a temperature approximately that slightly above freezing. The liquid bearing the solids, and having an aqueous content, is then delivered into the first of a series of dehydrating tanks provided with means for maintaining them in continuous agitation and preferably with means to remove any ice that adheres to the refrigerated surfaces. Associated with such agitation means is a much higher speed mechanism such as a propeller that drives the liquid bearing the solids downwardly against the bottom of the tank and thence upwardly over the horizontal and vertical stirrers and scrapers so as to maintain the entire body of liquid in movement constantly over the refrigerated surfaces and to maintain the whole body liquid and any ice being formed in a state of turbulence to prevent any solids freezing and to keep the entire mass in a homogeneous condition as well as a fluid condition.

Upon opening the bottom of the tank, having frozen into the crystal ice crystals the desired amount of water, the entire mass of ice and the liquid bearing the solids is dumped from a height into a trough where it can flow by gravity to a separating mechanism. This separating mechanism separates the main body of liquid bearing the solids for immediate return to the next succeeding tank of lower temperature. The ice with whatever retained liquid and solids is then passed to a centrifuge where the liquid bearing the solids is separated from the ice. The ice thus used is employed for reseeding purposes in other tanks or is used for precooling purposes. The juice so extracted from the ice which has been adhering to it is returned to the liquid circuit for further dehydration.

Referring to the drawings specifically, 1, 2, 3, 4, 5 designates a series of dehydration tanks, each of which is similarly equipped. In practice they may be either of the same size, but preferably of decreasing sizes. These tanks are refrigerated by the refrigerant in the jackets 6 connected to pipes 7 and 8 for the circulation of the refrigerant. In the first tank No. 1 the pipe 9 supplies the liquid to be dehydrated. The bottom of the tank is conical and preferably arranged in an angle of about 45° as at 10. It is provided with a flap valve 11, hinged at 12 and maintained in closed position by a feed spring 13. The valve engages a yielding gasket 14 between it and the bottom edge of the conical bottom 10 of the tank. This conical bottom is preferably not refrigerated and not insulated.

The propeller 15 driven by the shaft 16 drives the liquid downwardly and upwardly over the horizontal portion 17 and the vertical portion 18 of the stirrer scrapers. Thus the contents of the tank as it progressively becomes stiffer and stiffer is maintained in a fluid condition in the form of a mass of ice crystals. These ice crystals float within the main body of the liquid bearing solids.

Upon opening the valve 11 the entire contents descends under the force of gravity and due to the fact that the propeller 15 tends to drive the contents of the tank out of the tank. Thus the descent of the ice and the liquid bearing the solids is sufficiently fast and passes a sufficient distance to permit the initial separation of the ice from the heavier liquid bearing the solids. The trough 19 is arranged to receive this discharge and to pass the material through the pipe 20 to the trough 21 and thence into the interior of a cylindrical screen 22 which is maintained within the outer spaced tubular member 2. Within the screen is a rotating screw 24 on its driving shaft 25. This screen serves to permit the main body of the liquid and the solids both by the liquid to float into the funnel 26 and then to the return pump 27 which returns the liquid to any one of the suceeding tanks. The screw serves to agitate the remaining ice and liquid so as to facilitate the separation of the liquid bearing the solids from the ice. That portion of the ice and liquid bearing solids which do not separate is then discharged through the chute 27 into the hopper 28 of the centrifuge 29. The hopper feeds the ice and the liquid bearing the solids into the basket 30 which is perforated so that the centrifugal force drives the ice against the interior wall of the basket from which it is scraped and discharged by the scraper 31 delivering through the discharge chute 32. The liquid, in being restored by the screen passes into the space between the basket and the interior of the housing of the centrifuge 29 hence it passes by gravity through the hopper 33, pipes 34 into the return pump 27. This pump is connected to a manifold 35 which is connected in turn to a series of pipes 36, 37, 38, and 39, each of which is controlled by a valve 40. These pipes respectively deliver liquid bearing solids to tanks 2, 3, 4, and 5. The pipe is provided at the end of the cycle of separation as at 41 through which the dehydrated juice can be discharged for use through the valve 42.

Turning to the modification in Figure 4, a continuous chain belt 43 is employed in the place of the screw 24. The liquid passing through the screen is caught in the trough 44 and conveyed to the pump 27. If desired the screen may be vibrated. Otherwise, the operation is the same as that heretofore indicated.

In Figure 6 the modification shown with a vibrating screen works in the same manner. The vibrating screen indicated at 45 makes the initial separation between the ice and the liquid bearing the solids. This vibrating screen mechanism may be used with or without a continuously moving screen 43. In any event, the result is the same and the adaptation of these several methods of separation can be left to the judgment and needs of the user.

I claim:

1. In a method of dehydration of solid bearing liquids, freezing the water in said liquid in a freezing tank wherein said liquid is subjected to a series of successive freezing treatments at progressively lower temperatures, the steps comprising, converting the solid bearing liquid and resulting ice into a slush, maintaining the slush in a continuous state of fluid agitation in the tank; dumping the full contents of the tank, conveying the dumped contents of the tank over a stationary screen to separate the major portion of the liquid bearing the solids from the ice with the ice being agitated during the separation of a portion of the entrained liquid bearing solids, and returning at least a portion of the resultant treated liquor to the cycle of freezing dehydration treatment to produce a product having the desired water content.

2. In a method of dehydration of solid bearing liquids, freezing the water in said liquid in a freezing tank wherein said liquid is subjected to a series of successive freezing treatments at progressively lower temperatures, the steps comprising converting the solid bearing liquid and resulting ice into a slush, maintaining the slush in a continuous state of fluid agitation in the tank; dumping the contents of the tank, screening the contents of the tank to separate the major portion of the liquid bearing the solids and the ice with a portion of the entrained liquid bearing solids, agitating said ice during screening with the entrained liquid bearing the solids to release the liquid bearing the solids from the ice, and thereafter centrifuging the so treated ice to remove the remaining liquid bearing solids from the ice, and returning at least a portion of the resultant treated liquor to the cycle of freezing dehydration treatment to produce a product having the desired water content.

3. In an apparatus for freeze dehydration of liquid bearing solids, a refrigerated tank, means for stirring and scraping the walls of said tank, means within the tank for maintaining the liquid bearing solids and any ice crystals formed therein in a continual state of agitation as a fluid mass within said tank, valve means on the tank for dumping the entire mass from the tank, an open chute for receiving said mass located a distance from said tank to permit gravitational release and expansion of the mass of ice crystals to free the liquid bearing solids, and screen means at the discharge end of said chute for receiving said mass and for separation of liquid bearing solids from the ice crystals.

4. In an apparatus for freeze dehydration of liquid bearing solids and separating the ice formed therefrom, a refrigerated tank, means for stirring and scraping the walls of said tank, means for maintaining the liquid bearing solids and any ice crystals formed therein in a continual state of agitation as a fluid mass within said tank, means for dumping the entire mass from said tank, an open chute for receiving said mass and located a distance from said tank to permit expansion and disintegration of ice crystals to free the liquid bearing solids, and means connected with said chute comprising a screen, a fluid collector beneath said screen and a screw adapted to move the material within and along the screen to its discharge end whereby the liquid bearing solids are separated from the ice crystals in large part and the remaining ice crystals and liquid bearing solids are discharged separately therefrom.

5. In an apparatus for freeze dehydration of liquid bearing solids and separating the ice formed therefrom, a plurality of refrigerated tanks, means for stirring and scraping the walls of said tank, means for maintaining the liquid bearing solids and any ice crystals formed therein in a continual state of agitation as a fluid mass within said tanks, means for selectively dumping the entire mass from any one of said tanks, an open chute for receiving said mass and located a distance from said tank to permit expansion and disintegration of ice crystals to free the liquid bearing solids, means connected with said chute comprising a screen, a fluid collector beneath said screen and a screw adapted to move the material within and along said screen to its discharge end whereby the liquid bearing solids are separated from the ice crystals in large part and the remaining ice crystals and liquid bearing solids are discharged separately therefrom, a centrifuge for receiving and separating the ice crystals from the remaining liquid bearing solids, and means for returning at least a portion of the resultant treated liquor for additional freezing treatment.

6. In combination, a tank, means of closing the tank with a plate to act as a valve whereby upon moving the plate the entire contents of the tank can be dumped, means in said tank comprising horizontal and vertical stirrers and scrapers, and a propeller in close proximity to said plate to drive the contents of the tank against said plate and over said scraper stirrers and drive the contents out of said tank when the plate valve is opened.

7. A method of dehydrating liquids bearing solids to recover a liquid containing the desired water content comprising the steps of (a) subjecting said liquid to a freezing temperature to freeze a portion of the water constituent therein as ice crystals forming a slushy mass containing the mother liquor and ice crystals, (b) subjecting the resultant slushy mass to a screening treatment to remove the mother liquor bearing solids from the ice crystals, (c) conveying the mother liquor bearing solids and substantially free of ice crystals to a discharge station, (d) removing a portion of said mother liquor and returning the same for an additional freezing and ice crystal separation treatment, (e) subjecting the recovered ice crystals to centrifuging to remove mother liquor adhering to said crystals, and (f) combining the mother liquor recovered from centrifuging with the aforementioned mother liquor.

8. In an apparatus for freezing liquids containing water and solids and separating ice crystals formed therein from the liquid containing solids, a plurality of refrigerated tanks for freezing therein said liquids containing water and solids into a fluid mass composed of ice crystals and liquid containing solids, screen means for receiving said mass, means for moving said mass along said screen to separate the liquid containing solids from the ice, a collector for said liquid containing solids positioned adjacent said screen for receiving said liquid containing solids free from the ice crystals, means for recovering the ice crystals with any remaining adhering liquid containing solids, and means for returning at least a portion of the resultant treated liquor containing solids for additional freezer treatment.

9. In an apparatus for freezing liquids containing water and solids and separating ice crystals formed therein from the liquid containing the solids, a plurality of refrigerated tanks for freezing therein said liquids containing water and solids into a fluid mass composed of ice crystals and liquid containing solids, screen means for receiving said mass, means for conveying said mass to said screen means, means for moving said mass along to said screen to separate the liquid containing solids from the ice, a collector mounted adjacent said screen for receiving said liquid containing solids free from the ice crystals, means for recovering the ice crystals with any remaining adhering liquid containing solids, a centrifuge for receiving said crystals for removing therefrom the remaining adhering liquid containing solids, and means for returning at least a portion of the resultant treated liquor containing solids for additional freezing treatment.

References Cited in the file of this patent

UNITED STATES PATENTS

| Number | Name | Date |
| --- | --- | --- |
| 981,860 | Jackson | Jan. 17, 1911 |
| 994,555 | Alexander | June 6, 1911 |
| 1,362,868 | Johnson | Dec. 21, 1920 |
| 1,546,669 | Monti | July 21, 1925 |
| 1,906,534 | Burke | May 2, 1933 |
| 2,186,887 | Steinbacher | Jan. 9, 1940 |
| 2,299,414 | Spiegl | Oct. 20, 1942 |
| 2,337,317 | Eggert | Dec. 21, 1943 |
| 2,448,802 | Holzker | Sept. 7, 1948 |